United States Patent [19]

Lücke

[11] Patent Number: 5,302,201

[45] Date of Patent: Apr. 12, 1994

[54] DEVICE FOR CARRYING OUT A SUGAR-COATING AND/OR FILM COATING METHOD

[75] Inventor: Roland Lücke, Paderborn, Fed. Rep. of Germany

[73] Assignee: Gebruder Lodige Maschinenbau GmbH, Fed. Rep. of Germany

[21] Appl. No.: 923,899

[22] PCT Filed: Feb. 16, 1991

[86] PCT No.: PCT/DE91/00128

§ 371 Date: Aug. 19, 1992

§ 102(e) Date: Aug. 19, 1992

[87] PCT Pub. No.: WO91/12790

PCT Pub. Date: Sep. 5, 1991

[30] Foreign Application Priority Data

Feb. 20, 1990 [DE] Fed. Rep. of Germany ....... 4005208

[51] Int. Cl.$^5$ .................. B05C 5/00; B05C 11/08
[52] U.S. Cl. ........................ 118/19; 118/24; 118/64; 118/303; 34/58; 34/133 J; 34/133 M; 34/133 P; 427/3
[58] Field of Search ............ 118/19, 24, 64, 303, 118/418; 34/8, 58, 133 H, 133 J, 133 M, 133 P, 133 Q; 427/3, 421

[56] References Cited

U.S. PATENT DOCUMENTS

| 3,834,347 | 9/1974 | Motoyama et al. | |
| 3,874,092 | 4/1975 | Huhlin | 118/19 |
| 4,476,804 | 10/1984 | Glatt et al. | 118/19 |
| 4,596,205 | 6/1986 | Dunajtschik | 118/19 |
| 4,640,218 | 2/1987 | Motoyama et al. | 118/19 |
| 5,033,405 | 7/1991 | Yamada et al. | 118/418 |
| 5,038,709 | 8/1991 | Yamada et al. | 118/418 |

FOREIGN PATENT DOCUMENTS

| 0056573 | 1/1982 | European Pat. Off. | |
| 0131152 | 6/1984 | European Pat. Off. | |
| 0189578 | 12/1985 | European Pat. Off. | |
| 3130166 | 7/1981 | Fed. Rep. of Germany | |
| 3336076 | 10/1983 | Fed. Rep. of Germany | |
| 3445515 | 12/1984 | Fed. Rep. of Germany | |
| 3502426 | 1/1985 | Fed. Rep. of Germany | |
| WO82/03972 | 11/1982 | PCT Int'l Appl. | 118/418 |
| 2057308 | 4/1981 | United Kingdom | 118/19 |

OTHER PUBLICATIONS

Brochure: Hi Coater "Film and Sugar Coating Systems" Gebrüder Lödige Maschinbeau GmbH, 1990.
Brochure: Hi-Coater WD 11.1982 SM/HICO-d-32.2000 "Hi-Coater das moderne und wirtschaftliche System für Tablettencoating" by Gebrüder Lödige Maschinenbau GmbH.

Primary Examiner—W. Gary Jones
Assistant Examiner—Todd J. Burns
Attorney, Agent, or Firm—Walter A. Hackler

[57] ABSTRACT

A device for carrying out a method of sugar-coating and/or film coating is provided with a partially perforated drum (48) which rotates about an axis (50). The inner space (47) of the drum can be exposed to a fluid flow (gas, fluid). The inner space (47) is associated with an element for guiding a gas flow which guides the gas flow as a controlled shell-shaped flow through the plane of the drum opening (43) and, with at least one longitudinal component with respect to the axis, through the inner space (47) of the drum (48).

7 Claims, 5 Drawing Sheets

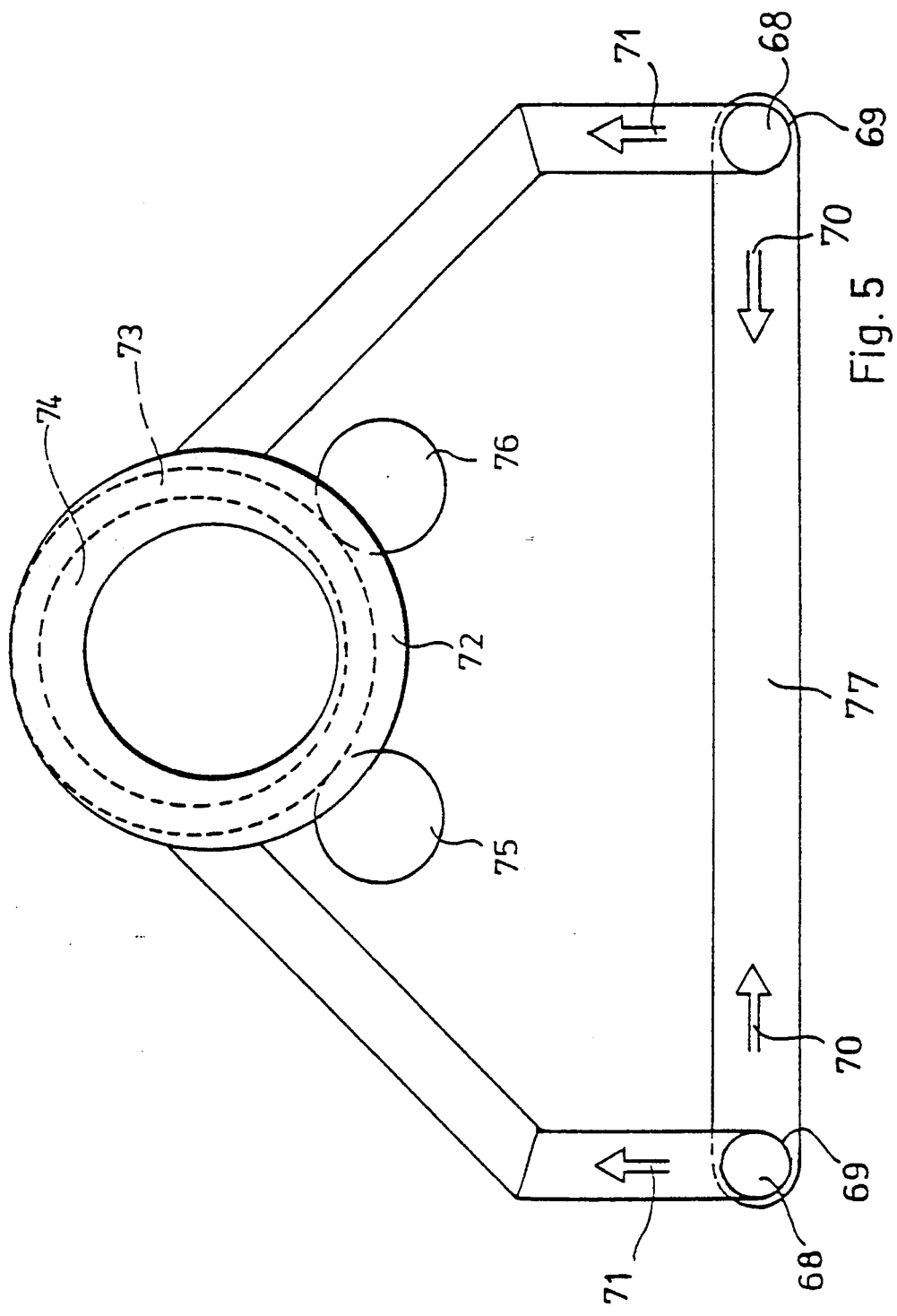

DEVICE FOR CARRYING OUT A SUGAR-COATING AND/OR FILM COATING METHOD

BACKGROUND OF THE INVENTION

Device with a drum for coating material which rotates about an axis, in particular for film and/or sugar-coating, the drum having an inner space which may be exposed to a fluid flow, wherein the inner space is associated with an element for guiding a gas flow which guides the gas flow as a controlled shell-shaped flow through the plane of the drum opening and, with at least one longitudinal component in the direction of the axis, through the inner space of the drum and wherein the element is formed by two cylindrical pipe sections which intermesh one another and delimit an annular gap between them.

A device of this type is known from EP-A-01 31 152.

In the case of the known device the drum rotates about an axis and the material to be coated inside the drum is exposed to a fluid flow. The fluid flow is guided via a distribution head at the end of the drum where the drive is provided into the inner space of the drum. Arms shaped like hollow bodies extend into the drum which comprise openings via which the fluid flow can be removed from the inner space of the drum.

Furthermore, a device for film or sugar-coating is known from the leaflet Hi-Coater WD 11.1982 SM/HICO-d 32.2000 under the term "Hi-Coater, the modern and economic system for the coating of tablets".

Devices of this kind are used in the pharmaceutical industry mainly for coating cores. The layers should be as uniform and smooth as possible and the revolving and rolling movements which cause the cores to be mixed with one another to a smaller or larger extent should be of such a nature that the wear, i.e. the shearing stress of the cores is kept small.

The sprayed cores should be dried as carefully as possible and the parameters specific to the method should be taken into consideration. The drying speed must be adjusted to the respective process in the best possible manner such that cracks in the coating of the core can be avoided for example.

In the case of the device known from the leaflet Hi-Coater WD 11.1982 SM/HICO-d 32.2000 the gas is guided to the drum in the area of the supply opening. The means by which the air is guided to the product bed are not very constructive. It immediately meets the surface of the supply opening opposite the air inlet opening. From there the incoming air moves towards the perforated pieces of sheet metal in the bottom area of the drum. Already in the inlet area the incoming air becomes turbulent and negative influences by a predetermined spray mist cannot be avoided. Furthermore the incoming air will preferably take the shortest way to the perforated pieces of sheet metal. This has the result that the heat and material exchange processes across the length of the drum are different.

In most cases, when the method steps are carried out one after the other or several at the same time, the drying process is the step during the entire method proceedings which determines the timing such that optimizing this is very advantageous. In addition thereto the drying process is also a method step in which the quality will be determined such that also from this point of view it is advisable to achieve that the cores are dried as uniformly as possible.

Considering the spraying device of the known device from WD 11.1982 SM/HICO-d 32.2000 it can be noted that the angle at which the spray jets are set with respect to the revolving product bed must be adjusted before a sugar-coating or film coating process can be started. Since the shape and the position of the cascade-like formation of cores that are carried upwards on the inside of the drum due to friction changes between the start of the process and a stationary state owing to mainly varying rotational speed of the drum, for optimizing the core treatment the setting angle of the spray jet with respect to the product bed would have to be changed also during the process.

SUMMARY OF THE INVENTION

Thus the invention is based on the object of further developing a device of the initially mentioned type in such a manner that the fluids which are used for the different coating processes can be used to an optimum extent and thus are utilized to a higher degree.

This object is achieved according to the invention in that the drum is partially perforated, that the element is disposed in or directly at the drum opening and that the axes of the cylindrical pipe sections are offset with respect to one another.

The device according to the invention thus has the essential advantage that turbulences of the gas are prevented already at the system inlet. The gas flow flows into the inner space of the drum in a controlled manner and only afterwards is deflected towards the perforated pieces of sheet metal in the bottom area of the drum. If the flow of the gas is adjusted in the direction of the axis of rotation of the drum a deflection of the gas flow is no longer necessary. Viewed across the entire length in the direction of the axis of the drum the gas flows towards the perforated pieces of sheet metal in the bottom area of the drum. The gas flow is guided steadily through the entire product bed towards the perforated pieces of sheet metal and thus is utilized to an optimum extent.

The gas flow surrounds the spraying device like a so-called gas-shell if the element is formed as pipe section and is disposed in or directly at the drum opening. By means of a constructive development of this type the incoming gas flow can be effectively controlled such that a uniform flow can be achieved irrespective of the gas penetration from the drum opening to the inner side of the back wall of the drum.

According to the invention the element is a cylindrical pipe section for guiding and adjusting the gas flow which can be produced in a particularly simple manner at low cost. The cylindrical pipe section forms with the cylindrical inner surface of the supply opening or with the cylinder-shaped drum opening an annular gap through which the incoming gas flows into the drum in a controlled manner.

The element delimits an annular gap, wherein the axes of the cylinder surfaces of the outer and inner periphery of the element and the axis of the cylinder surface of the drum opening are offset with respect to one another. For this reason it is possible to set different gap widths across the periphery of the drum opening. Owing to the eccentric arrangement of the element with respect to the drum opening the annular gap can be formed such that in the lower area of the drum opening only a little amount of gas flows into the inner space of the drum and that the main amount of the incoming gas flows into the system at the upper area of the drum opening in a controlled manner owing to the large width of the gap. The element may also be formed such that at the lower area of the drum opening gas does not flow into the drum and that only a controlled gas flow surrounds the spraying device from above in a shell-like-manner. The gas shell is open towards the bottom. A gas flow of this type does not have a negative influence on the spray mist of the spraying device even if the spraying device is disposed at a large distance from the product bed surface.

The element may also be formed as a cylinder or hollow cylinder of which the bottom and top surfaces are formed by an irregular closed curve. In this way the most different gap widths can be formed.

In a further development of the invention the element can be connected to gas supply channels which open radially from the outside into the annular gap of the element.

This has the advantage that the gas which is guided to the device can be distributed evenly over the outer surface of the element. If the gas supply channels are guided to the gap at an angle of less than 90° there is an additional adjustment of the gas flow. Preferred flow directions can be predetermined in an exact manner.

In a further development of the invention the fluid flows in a spraying device which can be adjusted during the treatment process.

This has the advantage that in the case of sugar-coating and film coating processes the setting angle of the spray mist with respect to the product bed can be adjusted to the position of the product bed depending on the rotational speed of the drum without interrupting the process. A better utilization of the suspensions, dispersions, highly viscous media etc. to be sprayed is possible since the using and working zone of the spray mist is always directed exactly on the product bed. Also in the case of high fluid permeation, the nozzles work in cycles, the media to be sprayed are used to an optimum extent since the spray mist is always directed on the product bed and no mistakes occur when spraying in the edge area of a product bed.

In a further development of the invention the spraying device comprises a spraying nozzle carrier which is rotatably disposed. In connection with a delicate catch of the rotational mechanism the spraying nozzle carrier can be adjusted. For adjusting the spraying nozzle carrier also electrical and/or pneumatical drives can be used, in particular if the device is operated in a programm-controlled manner and the method parameter are documented.

In a further advantageous development of the invention the distance between the spraying device and the free surface of coating material in the drum can be adjusted.

This has the advantage that for example also suspensions with high vaporising speed, i.e. small vaporising energies can be sprayed onto a product bed. For this purpose the free path length of the spray mist to the product bed surface is reduced. The cores can simultaneously be exposed to gas treatment.

In a further development of the invention the spraying device can be displaced in the direction of the axis of the drum. The central spraying of a medium in the drum and spraying across the length of the drum is thus possible by means of several nozzles. The spraying device can be inserted into the drum at various lengths.

If the spraying nozzle carrier is secured at one end on a first supporting arm section as pipe with a circular cross-section and if a further second supporting arm section is secured to a casing part in a displaceable and/or pivotable manner, the various movements of the spraying nozzle carrier and of the spraying device can be realised in an easy and constructive manner. By means thereof adjustments of the spraying nozzle carrier with respect to the first support arm section are defined and can be registered, displayed and recorded as method parameters or be recorded in data storages.

In a further development of the invention the element can be adjusted according to the position of a product bed for guiding the gas flow.

This has the advantage that the spray mist of the nozzles and the controlled gas flow can be adjusted in coordination to one another with respect to the position of the product bed. Spray mist and gas flow cannot influence one another in a negative manner.

The device according to the invention thus meets all extended requirements which are given in the production of pharmaceutical coatings. The device according to the invention ensures a simple optimization of the sugar-coating and film-coating processes. The gas flow is adjusted next to a reliable seal of the gas-guiding channels. It flows into the drum preferably in the centre area and inside it expands above the axis in the form of a shell. Incoming fluid quantities are utilized to a high degree by guiding them to the product bed under ideal conditions. The efficiency of spraying and drying is high such that in addition to coating methods in cycles also continuous coating methods can be performed without any disturbances. The quality of coated cores is improved since mistakes during the application of the film and during the drying process and also during the control of the process are reduced. Cracks in the film or the forming of bubbles owing to a spraying or drying speed which is too fast are avoided.

BRIEF DESCRIPTION OF THE DRAWINGS

Further advantages can be deduced from the description and the attached drawing. The above-mentioned features and those mentioned in the following may, according to the invention, be taken individually or in any combination with one another. The mentioned embodiments are not to be understood as final summary but rather have an exemplary meaning.

The invention is shown in the drawing and is further explained in the drawing with reference to embodiments. In the drawing:

FIG. 1 shows a device according to the invention for film coating and/or sugar-coating with a spraying device which extends from the device;

FIG. 2 shows a device according to the invention for film coating and/or sugar-coating with a front wall which is spaced apart from a casing part and a spraying device which is extended and pivoted;

FIG. 3 is a side view of a partial section of a front wall and the drum which rotates about an axis;

FIG. 3*a* shows a crescent-shaped gap for the controlled guiding of the gas;

FIG. 4 shows a schematic construction of a device for film coating and/or sugar-coating according to the invention; and FIG. 5 shows a schematic construction of the gas conduct in a front wall with an eccentrically formed annular gap.

The individual figures of the drawing show the object according to the invention partly in a very schematic manner and the dimensions are not exact. Some of the objects of the individual figures are shown at a very reduced or enlarged scale such that the construction thereof is better shown.

DETAILED DESCRIPTION

Figure 1:
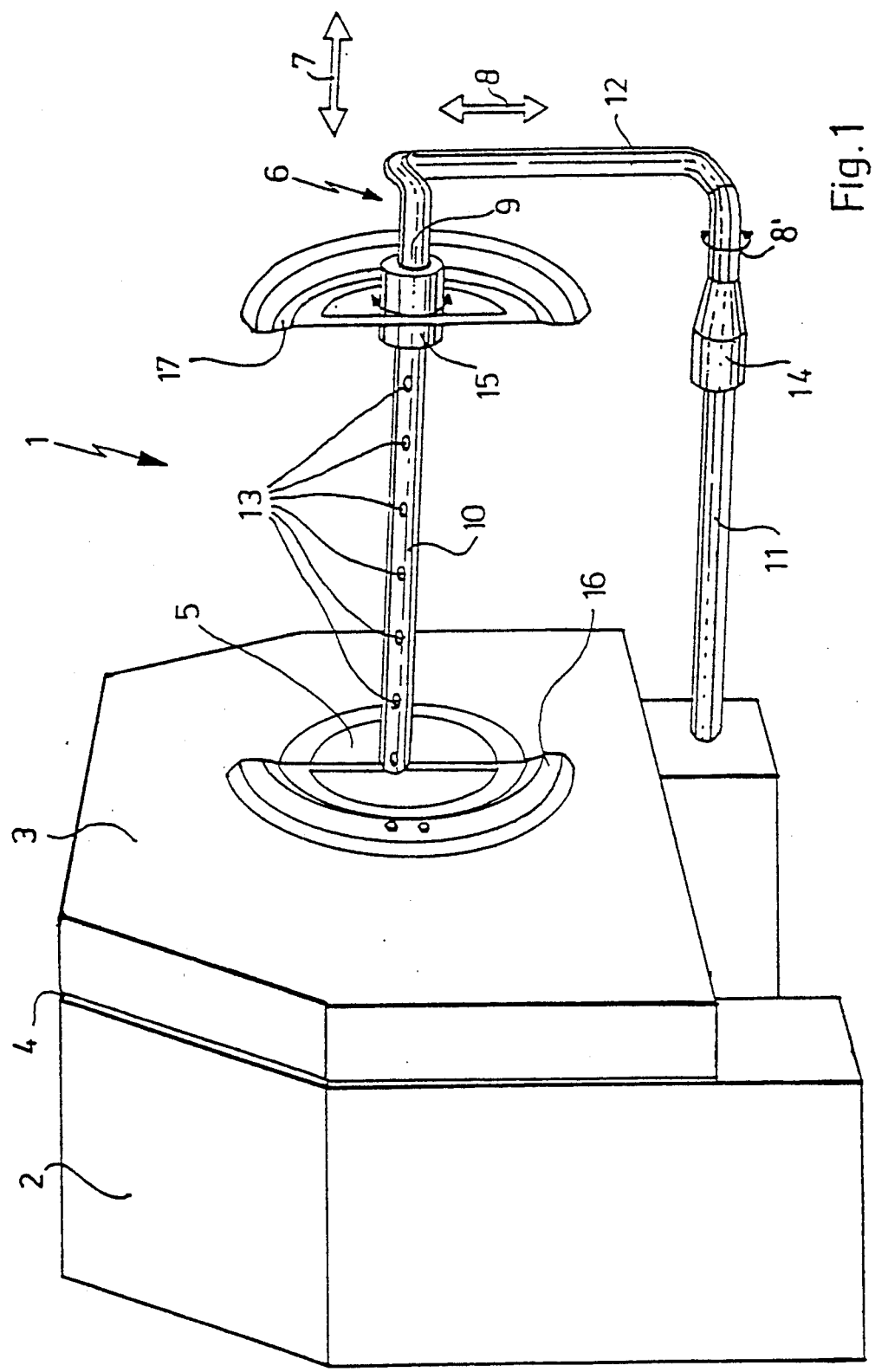

In FIG. 1, 1 denotes a device for film coating and sugar-coating of which the casing consists of a casing part 2 and a front wall 3. The casing part 2 accommodates in addition to other things a rotatably disposed drum and the drives necessary therefore. The front wall 3 can be extended to the casing part 2 and is sealed with respect to the casing part 2 while abutting the casing part 2, via a peripherally extending sealing element 4. A supply opening 5 is provided in the front wall 3 which opens directly into the drum opening of the rotating drum. Between the supply opening 5 and the drum flange front wall a sealing element is provided which seals the rotating drum against the stationary supply opening 5. Via the supply opening 5 a spraying device 6 may be extended into the inner space of the drum. The spraying device 6 can be extended in the directions of the arrow 7 and can be lowered or lifted in the direction of the arrows 8 and be pivoted in the direction of the arrow 8'.

The spraying device 6 comprises a first support arm section 9 which retains a spraying nozzle carrier 10 in a rotatable manner and a second support arm section 11 which is developed as extendable and pivotable guiding rail. The spraying device 6 is retained in the casing part 2 via the second support arm section 11. A central support arm section 12 is formed between the first support arm section 9 and the second support arm section 11 which guides the ducts to the spraying nozzle carrier 10. On the spraying nozzle carrier 10 nozzles of a known type are indicated by 13. The nozzles 13 are connected with ducts which are guided in the first support arm section 9 and in the central support arm section 12 and open into connections of a distributor 14. Ducts carrying fluid or gas may be connected to the distributor 14 via which the fluids and/or gases are supplied to the nozzles 13. If, for example, binary or airborne nozzles are used as nozzles 13 the gas may be guided in the first, second and central support arm section 9, 11, 12 and the ducts carrying fluid can be coupled to the spraying nozzle carrier 10 from the outside. The spraying nozzle carrier 10 can be turned within an angular range of approximately 30° by means of a handle 15 A first flap 16 is provided on the front wall 3 by means of which and a second flap 17 the supply opening 5 can be closed. In the embodiment of FIG. 1 the second flap 17 is secured on the spraying device 6.

Figure 2:
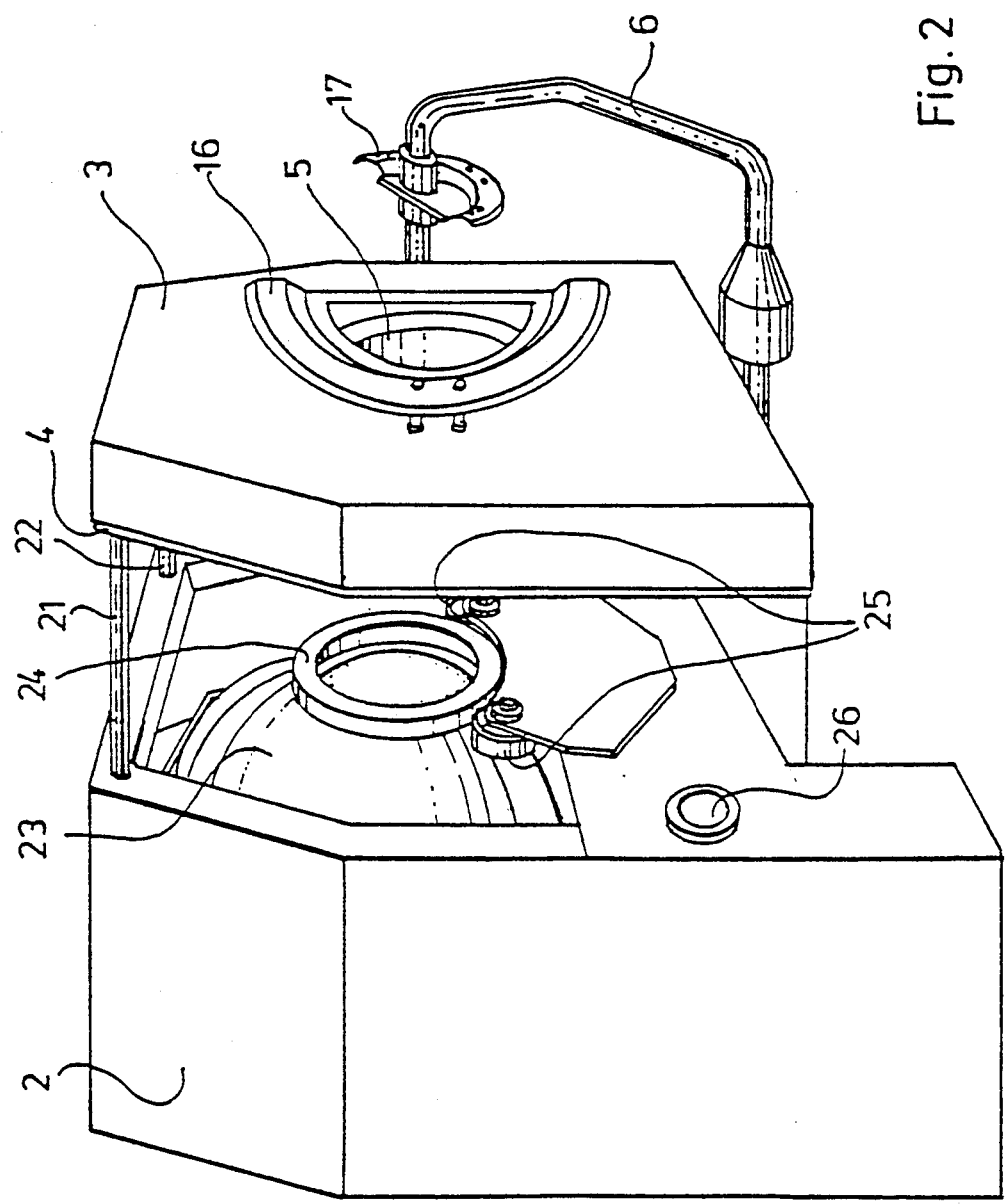

FIG. 2 shows a device for film coating and sugar-coating according to FIG. 1 wherein the front wall 3 is spaced apart from the casing part 2. The front wall 3 is held by guiding elements 21, 22. The guiding elements 21, 22 are rigidly connected to the front wall 3. The guiding elements 21, 22 are disposed in the casing part 2 in a displaceable manner. The front wall 3 can be sealed with respect to the casing part 2 via the sealing element 4. A drum 23 is rotatably disposed in the casing part 2. The drum opening is developed as drum flange 24 which abuts with its outer peripheral surface on rollers 25.

The back side of the drum 23 is developed in such a manner that it can be driven via a drive. The rotational speed of the rotating drum 23 can be changed in a continuously adjustable manner; the turning direction of the drum 23 can be selected, too. In a known manner the drum 23 is provided with a product outlet opening which is not shown in the figure via which the surrounded material can be removed from the drum 23 downwards into waiting containers.

On the side of the casing part 2 a gas supply channel 26 is guided which can be coupled to gas supply channels of the front wall 3 in a gastight manner. The gas is guided into the inner space of the drum 23 via the gas supply channels (see FIG. 5).

In FIG. 2 the spraying device 6 is conveyed and pivoted on the device in such a manner that the front wall 3 can be extended away from the casing part 2 via the guiding elements 21, 22. A free space is generated between the inner side of the front wall and the front face of the casing part. On the front side of the front wall 3 the first and second flaps 16 and 17 are partially opened or pivoted. The second flap 17 is pivoted with the spraying device 6, i.e. if the spraying device 6 extends from the inner space of the drum to the outside the second flap 17 is moved away from the supply opening 5, too.

Figures 3, 3A:
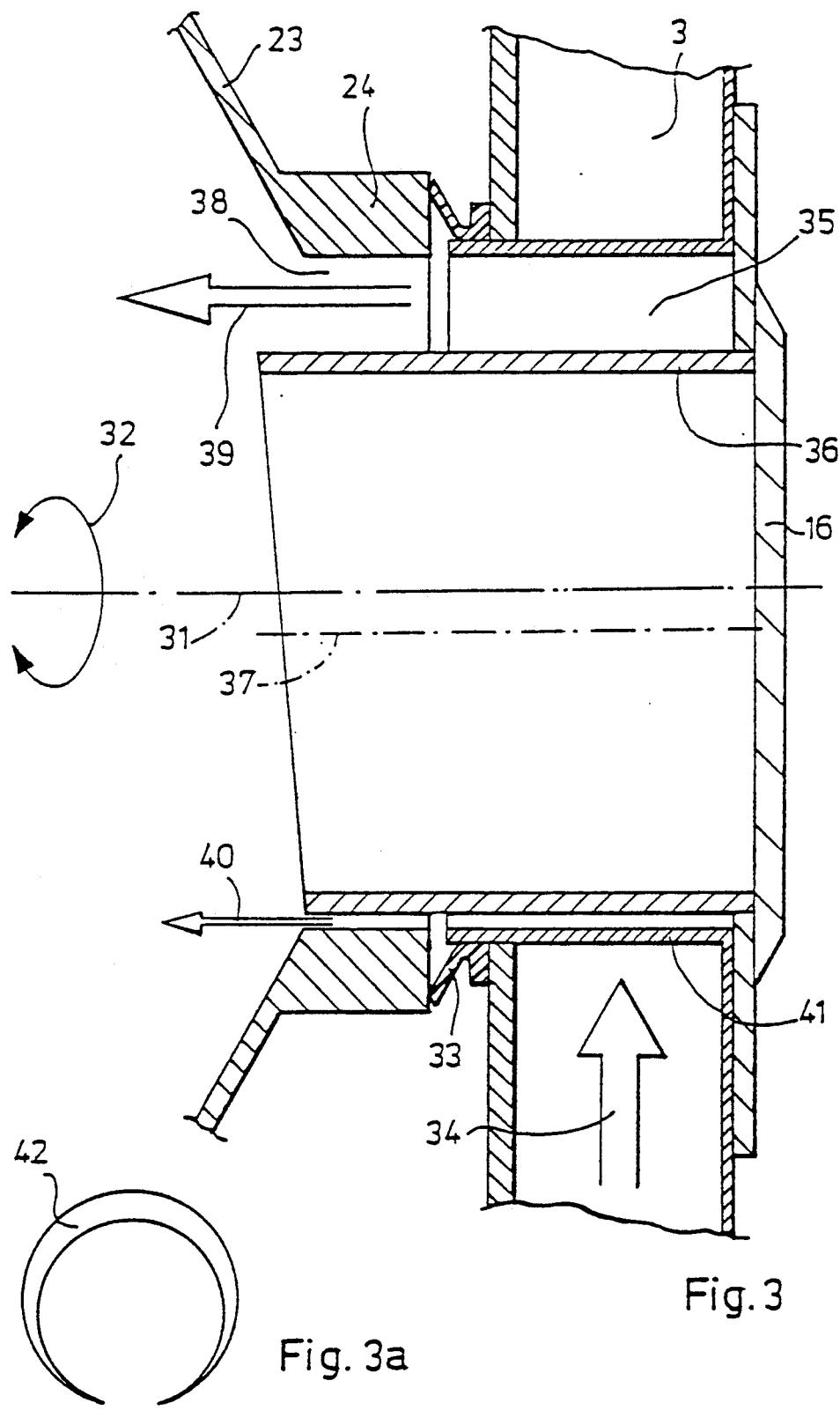

FIG. 3 shows a side view of a section with parts of the front wall 3 and of the drum 23. The drum 23 rotates about an axis 31 and the arrow 32 in the figure shows that the rotational direction of the drum 23 can be freely chosen. A sealing ring 33 of the front wall 3 is pressed on the front surface of the drum flange 24. By means of the sealing ring 33 a gap between the drum 23 and the front wall 3 is sealed in a gastight manner. During operation the front surface of the drum 23 rotates and the sealing ring 33 is disposed in a stationary manner. The gas coming out of the casing part of the device is guided to the front wall 3. The gas flows into an annular gap 35 of the front wall 3 in the direction of the arrow 34. The annular gap 35 is closed towards the first flap 16 in a gastight manner. The gas which flows into the annular gap 35 is evenly spread over the periphery of the annular gap 35 and can flow into the inside of the drum 23 via a opening which faces the drum flange 24. The device is operated in such a manner that the pressure inside the drum 23 is always lower than the pressure outside. The negative pressure in the drum 23 is built by constantly withdrawing more gas from the drum than supplying into it. The annular gap 35 is limited towards the inside by the shell surface of a pipe section 36 of which the axis 37 is offset with respect to the axis 31 of the drum 23. In the side view of FIG. 3 it becomes clear that owing thereto in the upper area of the drum opening 38 a gap 35 (off-centre circular slit) is formed which is larger than that in the lower area of the drum opening 38. When gas flows into the annular gap 35 it flows in the direction of the arrow 39 and 40 into the inner space of the drum 23. The gas is more likely to spread in the upper area of the drum 23 owing to the different gap widths. The pipe section 36 adjusts the gas flow in the direction of the inner space of the drum 23 and surrounds the axis 32 with a gas coating of varying density. The arrangement of the pipe section 36 in the figure is to be understood as an example. Its lateral extension in the direction of the drum may stop at the front wall and also the distance between the axis 37 and the axis 31 can be chosen such that no gap is formed in the lower part of the drum opening 38 and that the annular gap 35 is interrupted. If in a development of this type the pipe section abuts a surface 41 of the front wall a gas-carrying gap may form as shown in FIG. 3a. Subsequently the lower area of the inner space of the drum will not be supplied with a controlled gas flow.

FIG. 3a shows a crescent-shaped gap through which the gas flows to the drum. The gas flow is adjusted in the gap 42 and blown into the inner space of the drum, wherein the setting of the gas flow is chosen such that in the case of a simultaneous spraying process the spray mist is not influenced by the gas flow in a negative manner.

Figure 4:
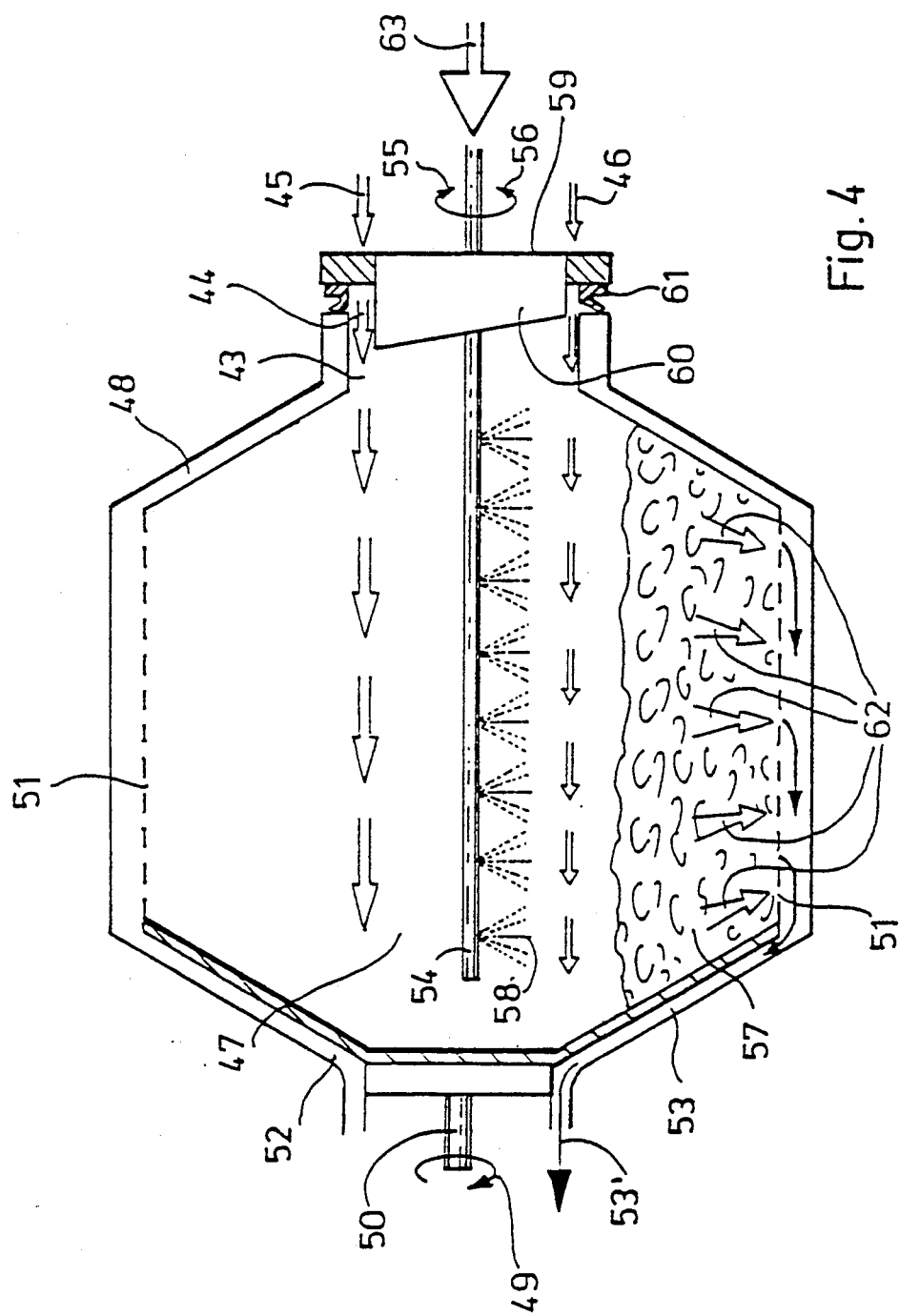

FIG. 4 shows in a very schematic manner the construction and the functioning of the device according to the invention in a longitudinal sectional view. An eccentric annular gap 44 is formed at the drum opening 43 via which the gas flows into an inner space 47 of the drum 48 in the direction of the arrows 45 and 46. At the same time the drum 48 rotates about the axis 50 in the direction of the arrow 49. The drum periphery is provided with partially perforated segments 51 via which the gas flow which enters through the eccentric annular gap can be discharged from the drum 48. Below the perforated segments 51 gas discharge channels 52, 53 are provided via which the gas is sucked out of the drum 48. The gas discharge channels 52, 53 are formed on the drum in a gastight manner and also rotate about the axis 50. The gas is discharged in the direction of the arrow 53'. Only if the perforated segment 51 is disposed in the bottom area the gas will be sucked out of the inner space 47 via the segment 51.

The figure also shows a spraying nozzle carrier 54 which is part of a spraying nozzle device. The spraying nozzle carrier 54 can be adjusted within a range of approximately 30° such that the spraying nozzle carrier 54 can be adjusted to the position of a product bed 57 in the drum 48 in the direction of the arrows 55, 56. A spray mist from nozzles 58 is directed at the product bed 57 in such a manner that the spray mist can reach the product bed 57 to an optimum extent.

If, when the drum 48 rotates and the gas flows inside the amount of the gas being discharged from the drum 48 is larger than the amount being supplied a negative pressure is generated in the inner space of the drum. For this purpose the supply opening 59 which is disposed opposite the drum 48 in a stationary manner with a pipe section 60 which forms an eccentric annular gap 44 is sealed with respect to the front wall of the drum opening 53 by means of a sealing ring 61.

Owing to the eccentric annular gap 44 the gas which flows into the inner space of the drum 48 will flow as a controlled flow into the bottom of the drum 48. The gas surrounds the spraying nozzle carrier 54 in the inner space of the drum in a shell-shaped manner. The gas is sucked out of the drum via the segments 51 in the bottom area of the drum 48, i.e. the gas is guided in a forced flow, which is shown in the figure by arrow 62, through the product bed 57. The fluid sprayed by the nozzles 58 which flows towards the spraying nozzle carrier 54 from the direction of the arrow 63 is sprayed into the same direction from which the gas is withdrawn from the drum 48. For this reason this method is called co-current method. The spraying of the fluid is adjusted to the gas flow in the drum.

FIG. 5 shows in a very schematic manner how the gas is guided in the front wall 3 of the device. The gas carrying channels of the casing part and of the front wall can be connected to one another via connecting pieces 68 of the casing part and connecting pieces 69 of the front wall which can be coupled to one another in a gastight manner. The gas is guided in the front wall in the direction of the arrows 70 and 71. The gas is guided such that it flows radially into an annular space 72 which is offset with respect to a front wall 73 of the drum opening. The front wall 73 is shown in the figure by broken lines. Owing to the arrangement of the annular space 72 with respect to the front wall 73 of the drum opening an annular gap 74 is generated of which the width is larger in the upper area than in the lower area. For this reason, gas which flows into the inner space of the drum via the annular gap 74 is more likely to flow into the upper area of the drum. The figure also shows guiding rollers 75 and 76 of the drum opening flange.

The connecting pieces 69 which are arranged in the edge area of the front wall are connected to one another via a pressure compensation channel 77. Gas which flows into the connecting pieces 69 of the front wall via the connecting pieces 68 of the casing part can flow into the direction of the arrow 70 and also of the arrow 71.

What is claimed is:

1. Device for coating material, said device comprising:
a partially perforated drum mounted for rotation about an axis, the drum having an opening and an inner space for accepting a coating fluid flow wherein the inner space is associated with an element means which is disposed at the drum opening and in communication with said inner space, for guiding a gas flow as a controlled shell-shaped flow through a plane of the drum opening with at least one longitudinal component of the gas flowing in the direction of the drum axis, thought the inner space of the drum, the element means being formed by two cylindrical pipe sections which intersect one another and delimit an annular gap between the pipe sections, said annular gap containing the shell-shaped flow, and wherein the element is disposed in or directly at the drum opening and the axes of the cylindrical pipe sections are offset with respect to one another.

2. Device according to claim 1, further comprising gas supply channels, connected to the element means, said gas supply channels opening radially into the annular gap of the element means.

3. Device according to claim 1, further comprising spraying device means for adjusting said coating fluid flow, said spraying device means comprising a spraying nozzle carrier rotatably disposed in said inner space.

4. Device according to claim 3 further comprising means for varying a distance between the spraying device means and a free surface of material to be coated in the drum.

5. Device according to claim 3 further comprising means for displacing the spraying device means in the axial direction of the drum.

6. Device according to claim 3 wherein the spraying nozzle carrier has a circular cross-section and is secured to one end of a first support arm section of the sprayer device means in a rotatable manner and a second support arm section of the sprayer device means is secured on a casing in a displaceable manner.

7. Device according to claim 1, further comprising means for adjusting the element means with respect to a position of a product bed within the drum.

* * * * *